United States Patent
Liao (10) Patent No.: US 9,836,380 B2
(45) Date of Patent: Dec. 5, 2017

(54) SYSTEMS AND METHODS FOR TESTING TERMINAL APPLICATIONS

(71) Applicant: Tencent Technology (Shenzhen) Company Limited, Shenzhen (CN)

(72) Inventor: Haizhen Liao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 54 days.

(21) Appl. No.: 14/795,358

(22) Filed: Jul. 9, 2015

(65) Prior Publication Data

US 2015/0339215 A1 Nov. 26, 2015

Related U.S. Application Data

(63) Continuation of application No. PCT/CN2014/081366, filed on Jul. 1, 2014.

(30) Foreign Application Priority Data

Jul. 2, 2013 (CN) .......................... 2013 1 0274934

(51) Int. Cl.
*G06F 9/44* (2006.01)
*G06F 11/36* (2006.01)
(Continued)

(52) U.S. Cl.
CPC ...... *G06F 11/3624* (2013.01); *G06F 11/3644* (2013.01); *G06F 11/3664* (2013.01);
(Continued)

(58) Field of Classification Search
CPC ............. G06F 11/3688; G06F 11/3664; G06F 11/323; G06F 9/44589; G06F 11/3684
See application file for complete search history.

(56) References Cited

U.S. PATENT DOCUMENTS 7,519,864 B2   4/2009  Alam et al.
8,467,987 B1 *  6/2013  Davidson ............ G06F 11/3672
                                                                455/408
(Continued)

FOREIGN PATENT DOCUMENTS

CN        1912848 A      2/2007
CN      101594627 A     12/2009

OTHER PUBLICATIONS

Holzmann et al., "Multivariate Testing of Native Mobile Applications", ACM, MoMM'14, Dec. 2014, pp. 1-10; <http://dl.acm.org/citation.cfm?id=2684119&CFID=968133826&CFTOKEN=57638951>.*

(Continued)

*Primary Examiner* — Thuy Dao
*Assistant Examiner* — Ben C Wang
(74) *Attorney, Agent, or Firm* — Jones Day (57) ABSTRACT

Systems, devices and methods are provided for testing a terminal application. For example, a test component is implanted into a source code program of a terminal application to be tested; one or more preset debugging codes are written into the source code program of the terminal application; one or more function addresses of the debugging codes in the source code program of the terminal application are acquired and registered; compiling and executing the source code program; an application test page is generated on a terminal user interface; and in response to a test execution instruction being triggered by a client on the application test page, the debugging codes is called via the function addresses in the test component to test the terminal application.

24 Claims, 6 Drawing Sheets

(51) Int. Cl.
*G06F 9/445* (2006.01)
*G06F 11/32* (2006.01)

(52) U.S. Cl.
CPC ...... *G06F 11/3684* (2013.01); *G06F 9/44589* (2013.01); *G06F 11/323* (2013.01); *G06F 11/3688* (2013.01)

(56) References Cited

U.S. PATENT DOCUMENTS

| | | | | |
|---|---|---|---|---|
| 8,856,748 B1* | 10/2014 | Larsen | ................ | G06F 11/3668 |
| | | | | 717/125 |
| 9,152,541 B1* | 10/2015 | Kuo | .................... | G06F 11/3672 |
| 9,189,378 B1* | 11/2015 | Ryan | .................... | G06F 11/3664 |
| 9,208,063 B1* | 12/2015 | Sisinni | .................. | G06F 11/368 |
| 9,268,670 B1* | 2/2016 | Lachwani | ........... | G06F 11/3684 |
| 9,274,935 B1* | 3/2016 | Lachwani | ........... | G06F 11/3688 |
| 9,336,127 B2* | 5/2016 | Koneru | ............... | G06F 11/3688 |
| 2005/0039169 A1 | 2/2005 | Hsu et al. | | |
| 2005/0049814 A1 | 3/2005 | Ramchandani | | |
| 2005/0268285 A1 | 12/2005 | Bagley et al. | | |
| 2009/0197645 A1* | 8/2009 | Specchio | ............ | G06F 11/3684 |
| | | | | 455/558 |
| 2011/0107307 A1 | 5/2011 | Liu et al. | | |
| 2011/0320879 A1* | 12/2011 | Singh | .................... | H04W 24/06 |
| | | | | 714/38.1 |
| 2013/0179858 A1* | 7/2013 | Mecke | ................ | G06F 11/3688 |
| | | | | 717/106 |
| 2014/0095933 A1* | 4/2014 | Griesinger | .......... | G06F 11/3676 |
| | | | | 714/32 |
| 2014/0237451 A1* | 8/2014 | Koneru | ............... | G06F 11/3688 |
| | | | | 717/124 |
| 2014/0281714 A1* | 9/2014 | Matthews | ........... | G06F 11/2294 |
| | | | | 714/27 |
| 2015/0074649 A1* | 3/2015 | Lee | ......................... | H04L 67/02 |
| | | | | 717/124 |
| 2016/0034383 A1* | 2/2016 | Duan | .................. | G06F 11/3688 |
| | | | | 717/131 |
| 2016/0062879 A1* | 3/2016 | Tan | ..................... | G06F 11/3688 |
| | | | | 714/38.1 |
| 2016/0188440 A1* | 6/2016 | Bates | .................. | G06F 11/3624 |
| | | | | 717/129 |
| 2016/0217058 A1* | 7/2016 | Kidron | .................... | G06F 9/543 |
| 2016/0283356 A1* | 9/2016 | Waldman | ............ | G06F 11/3672 |
| 2016/0378648 A1* | 12/2016 | Ekambaram | ........ | G06F 11/3692 |
| | | | | 714/38.1 |
| 2017/0075797 A1* | 3/2017 | Ekambaram | ........ | G06F 11/3684 |
| 2017/0109270 A1* | 4/2017 | Ekambaram | ........ | G06F 11/3688 |

OTHER PUBLICATIONS

Lu et al., "Activity Page based Functional Test Automation for Android Application", IEEE, Nov. 2012, pp. 37-40; <http://ieeexplore.ieee.org/stamp/stamp.jsp?tp=&arnumber=6394920>.*

M'endez-Porras et al., "A Top-Down Design Approach for an Automated Testing Framework", Springer, Dec. 2015, UNCS 9454, pp. 37-49; <https://link.springer.com/content/pdf/10.1007%2F978-3-319-26401-1_4.pdf>.*

Patent Cooperation Treaty, International Search Report and Written Opinion of the International Searching Authority, dated Sep. 30, 2014, in PCT/CN2014/081366.

Patent Cooperation Treaty, International Preliminary Report on Patentability, dated Jan. 5, 2016, in PCT/CN2014/081366.

* cited by examiner

SYSTEMS AND METHODS FOR TESTING TERMINAL APPLICATIONS

CROSS-REFERENCES TO RELATED APPLICATIONS

This application is a continuation of International Application No. PCT/CN2014/081366, with an international filing date of Jul. 1, 2014, now pending, which claims priority to Chinese Patent Application No. 201310274934.X, filed Jul. 2, 2013, both applications being incorporated by reference herein for all purposes.

BACKGROUND OF THE INVENTION

Certain embodiments of the present invention are directed to computer technology. More particularly, some embodiments of the invention provide systems and methods for terminals. Merely by way of example, some embodiments of the invention have been applied to application testing. But it would be recognized that the invention has a much broader range of applicability.

Multiple repeated tests are often needed for application testing in a mobile phone (e.g., an iPhone) when an operation needs to be repeated many times in a testing scenario in order to improve test results. When a mobile phone is off-line and requires multiple repeated operations, such testing can only be accomplished by frequent manual clicking operations, or by downloading a test software from an external personal computer (PC) to simulate the manual click operations. The testing process is usually tedious for users and prolongs the testing time. For testing using a PC, a script often needs to be written on the PC in advance, which increases the testing cost and causes inconvenience for the testing. In addition, testing tools using a PC often lack portability.

Hence it is highly desirable to improve the techniques for testing terminal applications.

BRIEF SUMMARY OF THE INVENTION

According to one embodiment, a method is provided for testing a terminal application. For example, a test component is implanted into a source code program of a terminal application to be tested; one or more preset debugging codes are written into the source code program of the terminal application; one or more function addresses of the debugging codes in the source code program of the terminal application are acquired and registered; compiling and executing the source code program; an application test page is generated on a terminal user interface; and in response to a test execution instruction being triggered by a client on the application test page, the debugging codes is called via the function addresses in the test component to test the terminal application.

According to another embodiment, a device for testing a terminal application includes: a code addition module configured to implant a test component into a source code program of a terminal application and write one or more preset debugging codes into the source code program of the terminal application; a registration module configured to acquire one or more function addresses of the debugging codes in the source code program of the terminal application and register the function addresses into the test component; a compile-and-execute module configured to compile and execute the source code program and generate an application test page on a terminal user interface; and a test module configured to, in response to a test execution instruction being triggered by a client on the application test page, call the debugging codes via the function addresses in the test component to test the terminal application.

According to yet another embodiment, a platform for testing a terminal application includes a device that contains: a code addition module configured to implant a test component into a source code program of a terminal application and write one or more preset debugging codes into the source code program of the terminal application; a registration module configured to acquire one or more function addresses of the debugging codes in the source code program of the terminal application and register the function addresses into the test component; a compile-and-execute module configured to compile and execute the source code program and generate an application test page on a terminal user interface; and a test module configured to, in response to a test execution instruction being triggered by a client on the application test page, call the debugging codes via the function addresses in the test component to test the terminal application.

In one embodiment, a system for testing a terminal application includes a client and a platform for testing a terminal application including a device. The device includes: a code addition module configured to implant a test component into a source code program of a terminal application and write one or more preset debugging codes into the source code program of the terminal application; a registration module configured to acquire one or more function addresses of the debugging codes in the source code program of the terminal application and register the function addresses into the test component; a compile-and-execute module configured to compile and execute the source code program and generate an application test page on a terminal user interface; and a test module configured to, in response to a test execution instruction being triggered by the client on the application test page, call the debugging codes via the function addresses in the test component to test the terminal application. The client is configured to send the test execution instruction to the platform.

In another embodiment, a mobile terminal includes a platform for testing a terminal application that contains a device. The device includes: a code addition module configured to implant a test component into a source code program of a terminal application and write one or more preset debugging codes into the source code program of the terminal application; a registration module configured to acquire one or more function addresses of the debugging codes in the source code program of the terminal application and register the function addresses into the test component; a compile-and-execute module configured to compile and execute the source code program and generate an application test page on a terminal user interface; and a test module configured to, in response to a test execution instruction being triggered by a client on the application test page, call the debugging codes via the function addresses in the test component to test the terminal application.

In yet another embodiment, a non-transitory computer readable storage medium includes programming instructions for testing a terminal application. The programming instructions are configured to cause one or more data processors to execute certain operations. For example, a test component is implanted into a source code program of a terminal application to be tested; one or more preset debugging codes are written into the source code program of the terminal application; one or more function addresses of the debugging codes in the source code program of the terminal application are acquired and registered; compiling and executing the source code program; an application test page is generated on a terminal user interface; and in response to a test execution instruction being triggered by a client on the application test page, the debugging codes is called via the function addresses in the test component to test the terminal application.

For example, the devices, platforms, systems, terminals and methods disclosed herein are configured for automatic testing of terminal applications to reduce testing time for users, improve the testing efficiency of the terminal applications, and allow off-line testing so that the testing can be performed any time at any place.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
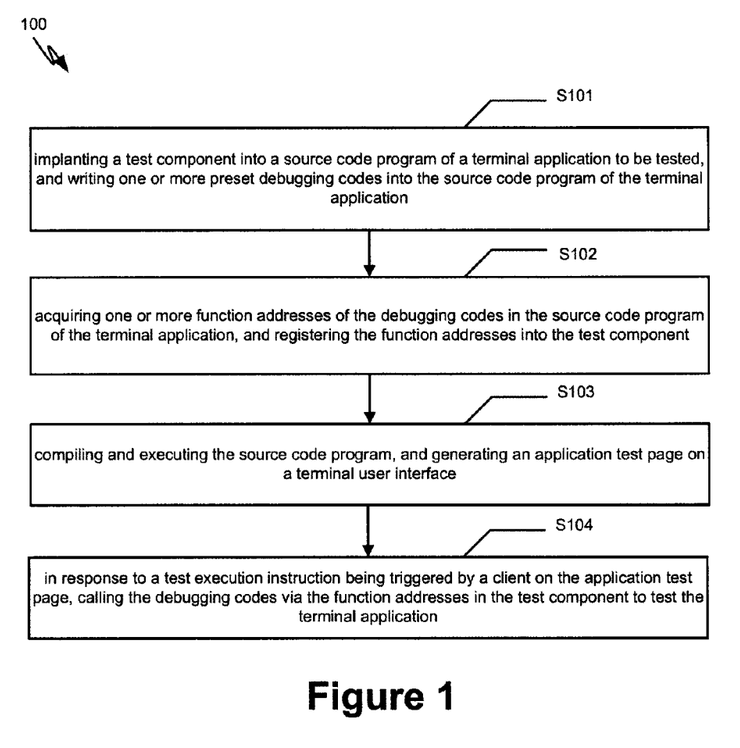
FIG. 1 is a simplified diagram showing a method for testing terminal applications according to one embodiment of the present invention.

FIG. 1 is a simplified diagram showing a method for testing terminal applications according to one embodiment of the present invention. The diagram is merely an example, which should not unduly limit the scope of the claims. One of ordinary skill in the art would recognize many variations, alternatives, and modifications. The method 100 includes at least processes S101-S104.

According to one embodiment, the process S101 includes: implanting a test component into a source code program of a terminal application to be tested, and writing one or more preset debugging codes into the source code program of the terminal application. For example, a terminal includes a mobile terminal such as a mobile phone or a tablet personal computer. The terminal application corresponds to an application on a mobile phone platform (e.g., an iPhone). In another example, as an auxiliary test tool, the test component is configured to assist in accomplishing a test of the terminal application. As a test data packet, the test component is implanted into the source code program of the terminal application. As an example, data from the test component generally is not modified after the test component is implanted into the source code program of the terminal application. Then, the test component is associated with a terminal user interface (UI) by initializing the source code program. An application test page can be generated on the terminal user interface during the subsequent compiling and running of the source code program. In some embodiments, an external open interface of the test component is formed on the terminal user interface. For example, the test component interacts with a UI controller at the terminal via the open interface, and receives a set parameter or a relevant operating command input by a client via the open interface.

According to another embodiment, a debugging code (e.g., a test case) is configured for each test scenario in order to test the terminal application. For example, each debugging code corresponds to a function or a method for testing the terminal application, and is written into the source code program of the terminal application during the particular operation. In another example, a function address is assigned to each debugging code when each debugging code is written into the source code program of the terminal application, so that the corresponding debugging codes can be found for running subsequent tests based on the function addresses. In yet another example, the debugging codes can be modified if needed after being written into the source code program of the terminal application.

According to yet another embodiment, the process S102 includes: acquiring one or more function addresses of the debugging codes in the source code program of the terminal application and registering the function addresses into the test component. For example, since one function address is assigned to each debugging code when each debugging code is written into the source code program of the terminal application, the function addresses of the debugging codes in the source code program of the terminal application are acquired and registered into the test component. During subsequent testing of the terminal application, the corresponding function addresses in the test component can be acquired by calling the test component, in some embodiments. For example, the corresponding debugging codes in the source code program can be called based on the function addresses to test the terminal application.

In one embodiment, the process S103 includes: compiling and executing the source code program and generating an application test page on a terminal user interface. For example, after early configuration preparation of the testing of the terminal application, the source code program into which both the test component is implanted and the debugging codes are written is compiled and executed. In another example, the application test page is generated on the terminal user interface. As an example, the external open interface of the test component is formed on the terminal user interface. The test component interacts with the UI controller of the terminal via the open interface, and receives the set parameter or the relevant operation command input by the client via the open interface, in certain embodiments. For example, the corresponding open interface of the test component on the application test page provides a test execution function key for the client. When a user clicks the test execution function key on the test page, the test component can be called via the open interface of the test component. The current default debugging code and test number are further set on the application test page, according to some embodiments. For example, a debugging code list and a test number option can also be set on the application test page for selection by the client as needed.

In another embodiment, the process S104 includes: in response to a test execution instruction being triggered by a client on the application test page, calling the debugging codes via the function addresses in the test component to test the terminal application. For example, an operator on the client side can be a developer of the terminal application test. In another example, when the client clicks the test execution function key on the test page, the test component is called via the open interface of the test component to acquire the function address corresponding to the current debugging code in the test component. In yet another example, the current debugging code is called from the source code program based on the function address of the current debugging code. As an example, the current debugging code can be a system default debugging code, or a debugging code selected by the client. Then, the terminal application is tested according to the default debugging frequency or debugging frequency selected by the client, in some embodiments.

Figure 2:
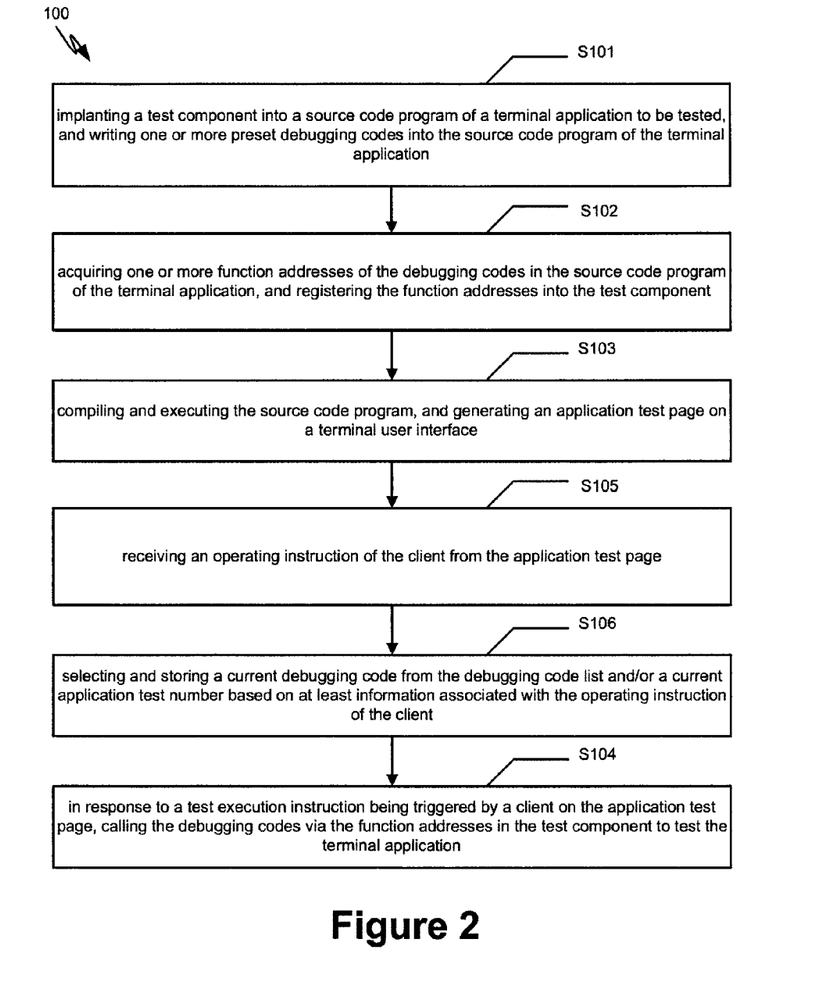
FIG. 2 is a simplified diagram showing a method for testing terminal applications according to another embodiment of the present invention.

FIG. 2 is a simplified diagram showing a method for testing terminal applications according to another embodiment of the present invention. The diagram is merely an example, which should not unduly limit the scope of the claims. One of ordinary skill in the art would recognize many variations, alternatives, and modifications. The method 100 further includes at least processes S105 and S106.

According to one embodiment, the process S105 includes: receiving an operating instruction of the client from the application test page. For example, the process S106 includes: selecting and saving a current debugging code from the debugging code list and/or a current application test number based on at least information associated with the operating instruction of the client. As an example, the debugging code list and the test number option are set on the application test page for selection by the client. The client can select the corresponding debugging codes from the debugging code list according to the needs of test scenarios, and set the test number of the terminal application in the embodiment.

According to another embodiment, when the test execution instruction triggered by the client on the test page is received, the test component is called via the open interface of the test component to acquire the function address corresponding to the current debugging code selected by the user in the test component. For example, the current debugging code is called from the source code program based on the function address of the current debugging code. Then, the terminal application is tested according to the current debugging frequency selected by the client.

Figure 3:
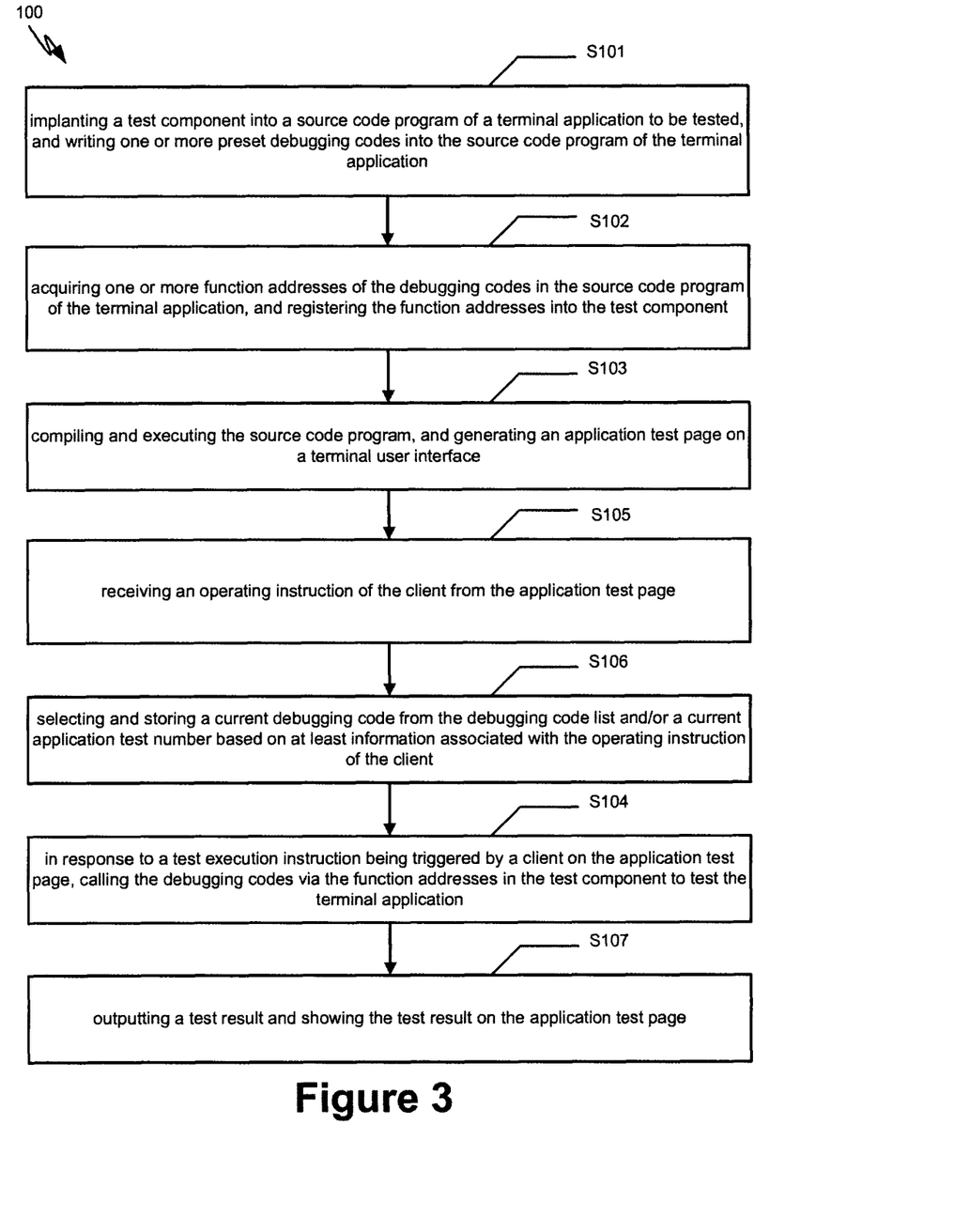
FIG. 3 is a simplified diagram showing a method for testing terminal applications according to yet another embodiment of the present invention.

FIG. 3 is a simplified diagram showing a method for testing terminal applications according to yet another embodiment of the present invention. The diagram is merely an example, which should not unduly limit the scope of the claims. One of ordinary skill in the art would recognize many variations, alternatives, and modifications. The method 100 further includes at least a process S107.

According to one embodiment, the process S107 includes: outputting a test result after the test and showing the test result on the application test page. For example, the test result after the test can also be output and shown on the application test page after the test is accomplished, so that the client can perform corresponding processing based on the test result in the embodiment. As an example, the test result can be information such as test success or failure, and test success number. As another example, the test result may be recorded in a log form, so that the status information in the log record can be shown on the test page of the terminal application.

Figure 4:
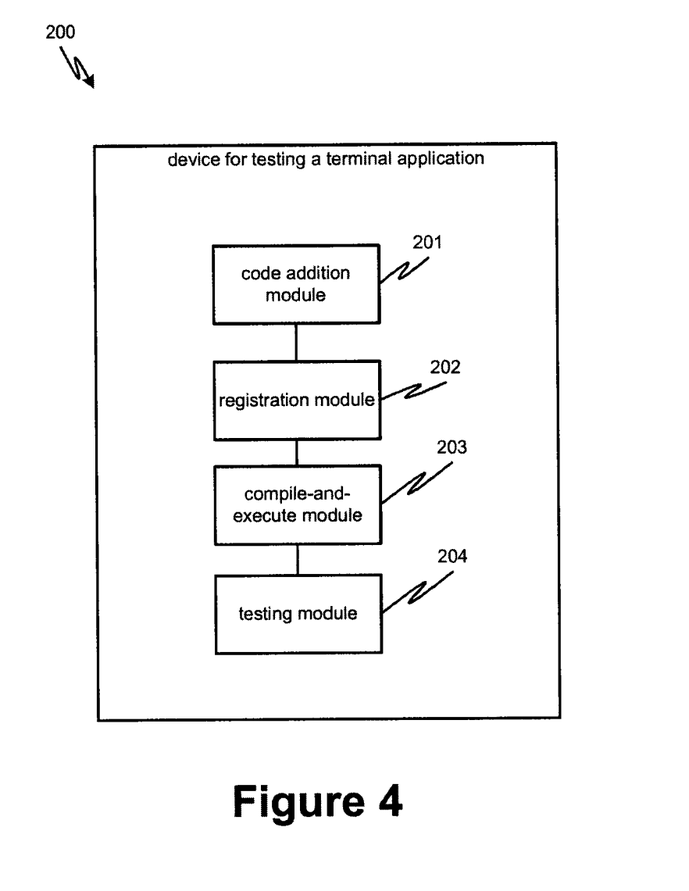
FIG. 4 is a simplified diagram showing a device for testing terminal applications according to one embodiment of the present invention.

FIG. 4 is a simplified diagram showing a device for testing terminal applications according to one embodiment of the present invention. The diagram is merely an example, which should not unduly limit the scope of the claims. One of ordinary skill in the art would recognize many variations, alternatives, and modifications. The device 200 includes a code addition module 201, a registration module 202, a compile-and-execute module 203 and a test module 204.

According to one embodiment, the code addition module 201 is configured to implant a test component into a source code program of the terminal application, and write preset debugging codes into the source code program of the terminal application. For example, the registration module 202 is configured to acquire function addresses of the debugging codes in the source code program of the terminal application, and register the function addresses into the test component. As an example, the compile-and-execute module 203 is configured to compile and execute the source code program, and generate an application test page on a terminal user interface. In another example, the test module 204 is configured to call the debugging codes via the function addresses in the test component to test the terminal application when a test execution instruction triggered by a client is received from the application test page. A terminal includes a mobile terminal such as a mobile phone or a tablet personal computer, according to certain embodiments. For example, the terminal application includes an application for a mobile terminal platform (e.g., an iPhone platform).

According to another embodiment, as an auxiliary test tool, the test component is configured to assist in accomplishing a test of the terminal application. For example, as a test data packet, the test component is implanted into the source code program of the terminal application via the code addition module 201. Data of the test component is not modified after the test component is implanted into the source code program of the terminal application, according to certain embodiments. For example, the test component is associated with the terminal user interface by initializing the source code program. The application test page can be generated on the terminal user interface during the compiling and running of the source code program. In another example, an external open interface of the test component is formed on the terminal user interface. The test component interacts with a UI controller of the terminal via the open interface, and receives a set parameter or a relevant operation command input by the client via the open interface, according to some embodiments.

In one embodiment, one corresponding debugging code (e.g., a test case) is configured for each test scenario in order to test the terminal application. For example, each debugging code corresponds to a function or a method for testing the terminal application, and is written into the source code program of the terminal application during the particular operation. One function address is assigned to each debugging code when each debugging code is written into the source code program of the terminal application, so that the corresponding debugging codes can be found for running subsequent tests based on the function addresses, according to certain embodiments. For example, the debugging codes can be modified as needed after written into the source code program of the terminal application.

In another embodiment, as one function address is assigned to each debugging code when each debugging code is written into the source code program of the terminal application, the function addresses of the debugging codes in the source code program of the terminal application are acquired and registered into the test component via the registration module 202. For example, during the test of the terminal application subsequently, the corresponding function addresses in the test component can be acquired by calling the test component, and further, the corresponding debugging codes in the source code program can be called based on the function addresses, to test the terminal application.

In yet another embodiment, after early configuration preparation of the test of the terminal application, the source code program into which both the test component is implanted and the debugging codes are written is compiled and run by the compile-and-execute module 203, and further, the application test page is generated on the terminal user interface. For example, the external open interface of the test component is formed on the terminal user interface. The test component interacts with the UI controller of the terminal via the open interface, and receives the set parameter or the relevant operation command input by the client via the open interface, in some embodiments. For example, the corresponding open interface of the test component on the application test page provides a test execution function key to the client. When a user clicks the test execution function key on the test page, the test component may be called via the open interface of the test component.

According to one embodiment, the current default debugging code and test number are further set on the application test page. For example, a debugging code list and a test number option can also be set on the application test page for selection by the client as required. As an example, an operator of the client may be a developer of the terminal application test. As another example, when the client clicks the test execution function key on the test page, the test module 204 calls the test component via the open interface of the test component to acquire the function address corresponding to the current debugging code in the test component, and the current debugging code is called from the source code program based on the function address of the current debugging code. As yet another example, the current debugging code includes a system default debugging code, or a debugging code selected by the client. The terminal application is tested according to the default debugging frequency or debugging frequency selected by the client.

Figure 5:
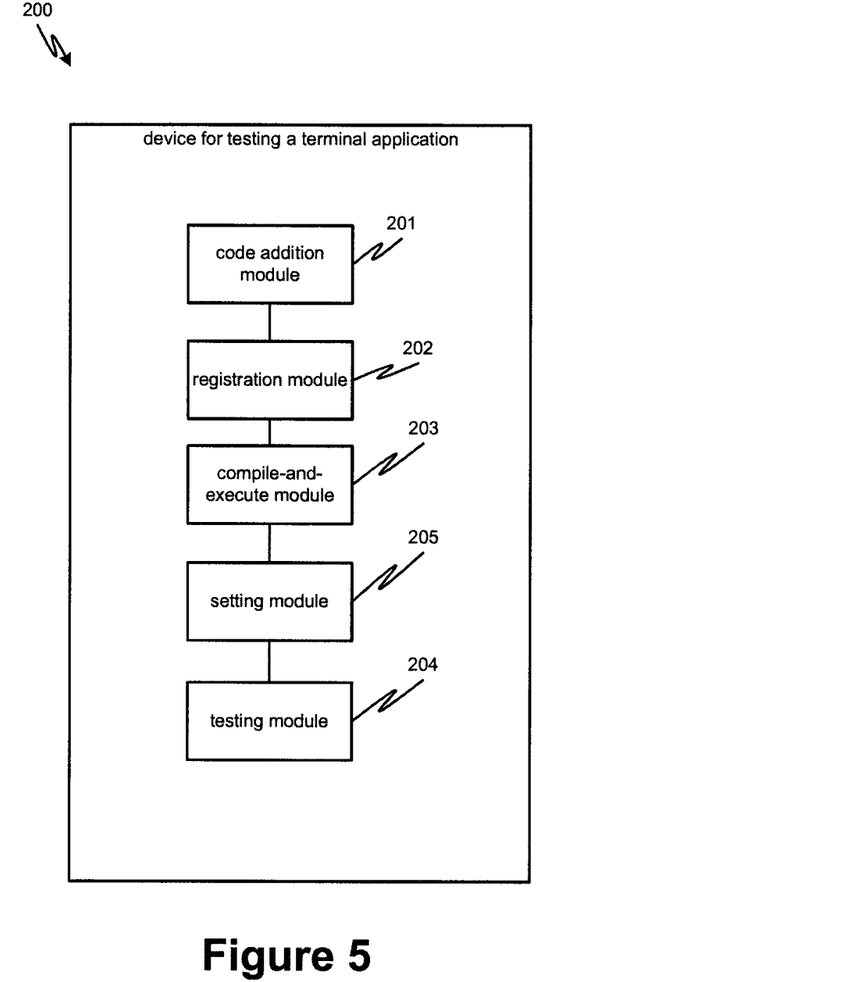
FIG. 5 is a simplified diagram showing a device for testing terminal applications according to another embodiment of the present invention.

FIG. 5 is a simplified diagram showing a device for testing terminal applications according to another embodiment of the present invention. The diagram is merely an example, which should not unduly limit the scope of the claims. One of ordinary skill in the art would recognize many variations, alternatives, and modifications. The device 200 further includes a setting module 205.

According to one embodiment, the setting module 205 is configured to receive an operating instruction from the client on the application test page, and select and save the current debugging code from the debugging code list, and/or the current application test number based on the operating instruction of the client. For example, the test module 204 is further configured to call the current debugging code selected by the client via the function address in the test component to test the terminal application according to the current test number selected by the client when receiving the test execution instruction triggered by the client on the application test page. As an example, the debugging code list and the test number option are set on the application test page for selection by the client. The client can select the corresponding debugging codes from the debugging code list based on the requirements of the test scenarios, and set the test number of the terminal application, in some embodiments.

According to another embodiment, when the test execution instruction triggered by the client on the test page is received, the test component is called via the open interface of the test component to acquire the function address corresponding to the current debugging code selected by the user in the test component, and the current debugging code is called from the source code program based on the function address of the current debugging code. Then, the terminal application is tested according to the current debugging frequency selected by the client.

Figure 6:
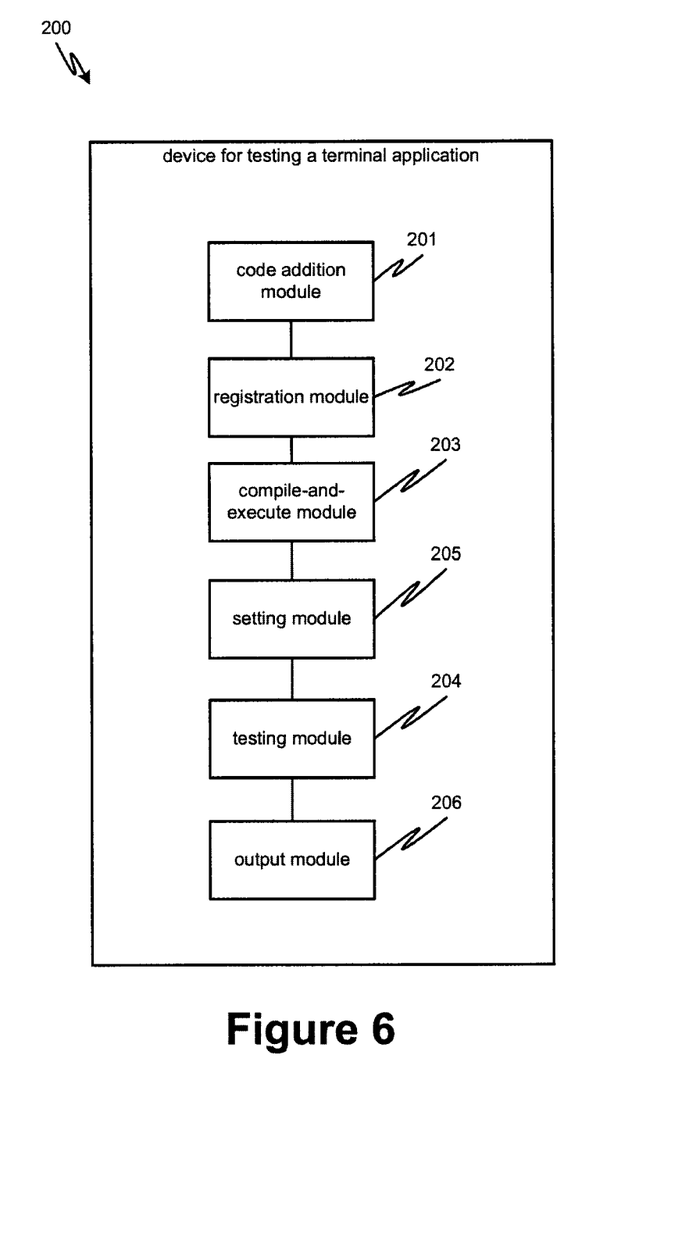
FIG. 6 is a simplified diagram showing a device for testing terminal applications according to yet another embodiment of the present invention.

FIG. 6 is a simplified diagram showing a device for testing terminal applications according to yet another embodiment of the present invention. The diagram is merely an example, which should not unduly limit the scope of the claims. One of ordinary skill in the art would recognize many variations, alternatives, and modifications. The device 200 further includes an output module 206.

According to one embodiment, an output module 206 is configured to output a test result after the test and show the test result on the application test page. For example, the test result after the test can be output and shown on the application test page after the test is accomplished, so that the client can perform the corresponding processing based on the test result in the embodiment. As an example, the test result may be information such as test success or failure information, and test success number. As another example, the test result can be recorded in a log form, so that the state information of the log record can be shown in the test page of the terminal application.

According to some embodiments, a platform for testing a terminal application includes the device 200 as shown in FIG. 4, FIG. 5 or FIG. 6. According to certain embodiments, a system for testing a terminal application includes a client and a platform for testing the terminal application. For example, the platform includes the device 200 as shown in FIG. 4, FIG. 5 or FIG. 6. As an example, the client is configured to send a test execution instruction to the platform to test the terminal application. According to some embodiments, a mobile terminal includes a platform for testing a terminal application which contains the device 200 as shown in FIG. 4, FIG. 5 or FIG. 6.

According to one embodiment, a method is provided for testing a terminal application. For example, a test component is implanted into a source code program of a terminal application to be tested; one or more preset debugging codes are written into the source code program of the terminal application; one or more function addresses of the debugging codes in the source code program of the terminal application are acquired and registered; compiling and executing the source code program; an application test page is generated on a terminal user interface; and in response to a test execution instruction being triggered by a client on the application test page, the debugging codes is called via the function addresses in the test component to test the terminal application. For example, the method is implemented according to at least FIG. 1, FIG. 2, and/or FIG. 3.

According to another embodiment, a device for testing a terminal application includes: a code addition module configured to implant a test component into a source code program of a terminal application and write one or more preset debugging codes into the source code program of the terminal application; a registration module configured to acquire one or more function addresses of the debugging codes in the source code program of the terminal application and register the function addresses into the test component; a compile-and-execute module configured to compile and execute the source code program and generate an application test page on a terminal user interface; and a test module configured to, in response to a test execution instruction being triggered by a client on the application test page, call the debugging codes via the function addresses in the test component to test the terminal application. For example, the device is implemented according to at least FIG. 4, FIG. 5, and/or FIG. 6.

According to yet another embodiment, a platform for testing a terminal application includes a device that contains: a code addition module configured to implant a test component into a source code program of a terminal application and write one or more preset debugging codes into the source code program of the terminal application; a registration module configured to acquire one or more function addresses of the debugging codes in the source code program of the terminal application and register the function addresses into the test component; a compile-and-execute module configured to compile and execute the source code program and generate an application test page on a terminal user interface; and a test module configured to, in response to a test execution instruction being triggered by a client on the application test page, call the debugging codes via the function addresses in the test component to test the terminal application. For example, the platform is implemented according to at least FIG. 4, FIG. 5, and/or FIG. 6.

In one embodiment, a system for testing a terminal application includes a client and a platform for testing a terminal application including a device. The device includes: a code addition module configured to implant a test component into a source code program of a terminal application and write one or more preset debugging codes into the source code program of the terminal application; a registration module configured to acquire one or more function addresses of the debugging codes in the source code program of the terminal application and register the function addresses into the test component; a compile-and-execute module configured to compile and execute the source code program and generate an application test page on a terminal user interface; and a test module configured to, in response to a test execution instruction being triggered by the client on the application test page, call the debugging codes via the function addresses in the test component to test the terminal application. The client is configured to send the test execution instruction to the platform. For example, the system is implemented according to at least FIG. 4, FIG. 5, and/or FIG. 6.

In another embodiment, a mobile terminal includes a platform for testing a terminal application that contains a device. The device includes: a code addition module configured to implant a test component into a source code program of a terminal application and write one or more preset debugging codes into the source code program of the terminal application; a registration module configured to acquire one or more function addresses of the debugging codes in the source code program of the terminal application and register the function addresses into the test component; a compile-and-execute module configured to compile and execute the source code program and generate an application test page on a terminal user interface; and a test module configured to, in response to a test execution instruction being triggered by a client on the application test page, call the debugging codes via the function addresses in the test component to test the terminal application. For example, the mobile terminal is implemented according to at least FIG. 4, FIG. 5, and/or FIG. 6.

In yet another embodiment, a non-transitory computer readable storage medium includes programming instructions for testing a terminal application. The programming instructions are configured to cause one or more data processors to execute certain operations. For example, a test component is implanted into a source code program of a terminal application to be tested; one or more preset debugging codes are written into the source code program of the terminal application; one or more function addresses of the debugging codes in the source code program of the terminal application are acquired and registered; compiling and executing the source code program; an application test page is generated on a terminal user interface; and in response to a test execution instruction being triggered by a client on the application test page, the debugging codes is called via the function addresses in the test component to test the terminal application. For example, the storage medium is implemented according to at least FIG. 1, FIG. 2, and/or FIG. 3.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for testing a terminal application, comprising:
    implanting a test component into a source code program of a terminal application to be tested;
    writing one or more preset debugging codes into the source code program of the terminal application;
    acquiring one or more function addresses of the debugging codes in the source code program of the terminal application;
    registering the function addresses into the test component;
    after registering the one or more function addresses into the test component, compiling the source code program having the one or more preset debugging codes implanted therein;
    executing the compiled source code program;
    generating an application test page on a terminal user interface; and
    in response to a test execution instruction being triggered by a client on the application test page, calling the debugging codes via the function addresses in the test component to test the terminal application, wherein:
    a debugging code list and an application test number option are set on the application test page; and
    the method further includes:
        receiving an operating instruction of the client from the application test page;
        selecting a current debugging code from the debugging code list or a current application test number based on at least information associated with the operating instruction of the client; and
        saving the current debugging code or the current application test number.

2. The method of claim 1, wherein the calling the debugging codes via the function addresses in the test component to test the terminal application includes:
    in response to the test execution instruction being triggered by the client on the application test page, calling the current debugging code selected by the client via a current function address corresponding to the current debugging code to test the terminal application according to the current test number selected by the client.

3. The method of claim 2, wherein the calling the debugging codes via the function addresses in the test component to test the terminal application includes:
    calling the test component to acquire the current function address corresponding to the current debugging code in the test component via an open interface of the test component on the application test page in the terminal user interface; and
    calling the current debugging code from the source code program based on the current function address.

4. The method of claim 1, wherein:
    a debugging code list and an application test number option are set on the application test page; and
    the method further includes:
        receiving an operating instruction of the client from the application test page;
        selecting a current debugging code from the debugging code list and a current application test number based on at least information associated with the operating instruction of the client; and
        saving the current debugging code and the current application test number.

5. The method of claim 1, further comprising:
    outputting a test result; and
    showing the test result on the application test page.

6. The method of claim 1, further comprising:
    initializing the source code program.

7. A device for testing a terminal application, comprising:
    one or more hardware processors;
    a code addition module configured to implant a test component into a source code program of a terminal application and write one or more preset debugging codes into the source code program of the terminal application;
    a registration module configured to acquire one or more function addresses of the debugging codes in the source code program of the terminal application and register the function addresses into the test component;
    a compile-and-execute module configured to, after the registration module registers the one or more function addresses into the test component:

compile and execute the source code program having the one or more preset debugging codes implanted therein; and generate an application test page on a terminal user interface; and a test module configured to, in response to a test execution instruction being triggered by a client on the application test page, call the debugging codes via the function addresses in the test component to test the terminal application;

a setting module configured to:
receive an operating instruction of the client from the application test page;
select a current debugging code from a debugging code list or a current application test number based on at least information associated with the operating instruction of the client; and
save the current debugging code or the current application test number;

wherein the debugging code list and an application test number option are set on the application test page.

8. The device of claim 7, further comprising:
a setting module configured to receive an operating instruction of the client on the application test page, select and save a current debugging code from the debugging code list or a current application test number based on at least information associated with the operating instruction of the client.

9. The device of claim 8, wherein the test module is further configured to, in response to the test execution instruction being triggered by the client on the application test page, call the current debugging code selected by the client via a current function address corresponding to the current debugging code to test the terminal application according to the current test number selected by the client.

10. The device of claim 9, wherein the test module is further configured to call the test component to acquire the current function address corresponding to the current debugging code in the test component via an open interface of the test component on the application test page in the terminal user interface and call the current debugging code from the source code program based on the current function address.

11. The device of claim 7, further comprising:
a setting module configured to receive an operating instruction of the client on the application test page, select and save a current debugging code from the debugging code list and a current application test number based on at least information associated with the operating instruction of the client.

12. The device of claim 7, further comprising:
an output module configured to output a test result and show the test result on the application test page.

13. The device of claim 7, wherein the code addition module is further configured to initialize the source code program.

14. The device of claim 7, further comprising:
a non-transitory computer-readable storage medium;
wherein one or more of the code addition module, the registration module, the compile-and-execute module and the test module are stored in the storage medium and configured to be executed by the one or more hardware processors.

15. A platform for testing a terminal application, comprising:

a device including:
one or more hardware processors;
a code addition module configured to implant a test component into a source code program of a terminal application and write one or more preset debugging codes into the source code program of the terminal application;
a registration module configured to acquire one or more function addresses of the debugging codes in the source code program of the terminal application and register the function addresses into the test component;
a compile-and-execute module configured to, after the registration module registers the one or more function addresses into the test component:
compile and execute the source code program having the one or more preset debugging codes implanted therein; and
generate an application test page on a terminal user interface; and
a test module configured to, in response to a test execution instruction being triggered by a client on the application test page, call the debugging codes via the function addresses in the test component to test the terminal application;
a setting module configured to:
receive an operating instruction of the client from the application test page;
select a current debugging code from a debugging code list or a current application test number based on at least information associated with the operating instruction of the client; and
save the current debugging code or the current application test number;
wherein the debugging code list and an application test number option are set on the application test page.

16. The platform of claim 15, wherein the device further includes:
a setting module configured to receive an operating instruction of the client on the application test page, select and save a current debugging code from the debugging code list or a current application test number based on at least information associated with the operating instruction of the client.

17. The platform of claim 16, wherein the test module is further configured to, in response to the test execution instruction being triggered by the client on the application test page, call the current debugging code selected by the client via a current function address corresponding to the current debugging code to test the terminal application according to the current test number selected by the client.

18. The platform of claim 17, wherein the test module is further configured to call the test component to acquire the current function address corresponding to the current debugging code in the test component via an open interface of the test component on the application test page in the terminal user interface and call the current debugging code from the source code program based on the current function address.

19. The platform of claim 15, wherein the device further includes:
a setting module configured to receive an operating instruction of the client on the application test page, select and save a current debugging code from the debugging code list and a current application test number based on at least information associated with the operating instruction of the client.

20. The platform of claim 15, further comprising:
an output module configured to output a test result and show the test result on the application test page.

21. The platform of claim 15, wherein the code addition module is further configured to initialize the source code program.

22. A system for testing a terminal application, comprising:
a client; and
a platform for testing a terminal application including a device;
wherein the device includes:
one or more hardware processors;
a code addition module configured to implant a test component into a source code program of a terminal application and write one or more preset debugging codes into the source code program of the terminal application;
a registration module configured to acquire one or more function addresses of the debugging codes in the source code program of the terminal application and register the function addresses into the test component;
a compile-and-execute module configured to, after the registration module registers the one or more function addresses into the test component:
compile and execute the source code program having the one or more preset debugging codes implanted therein; and
generate an application test page on a terminal user interface; and
a test module configured to, in response to a test execution instruction being triggered by the client on the application test page, call the debugging codes via the function addresses in the test component to test the terminal application;
a setting module configured to:
receive an operating instruction of the client from the application test page;
select a current debugging code from a debugging code list or a current application test number based on at least information associated with the operating instruction of the client; and
save the current debugging code or the current application test number;
wherein the debugging code list and an application test number option are set on the application test page; and
wherein the client is configured to send the test execution instruction to the platform.

23. A mobile terminal comprising:
a platform for testing a terminal application including a device;
wherein the device includes:
one or more hardware processors;
a code addition module configured to implant a test component into a source code program of a terminal application and write one or more preset debugging codes into the source code program of the terminal application;
a registration module configured to acquire one or more function addresses of the debugging codes in the source code program of the terminal application and register the function addresses into the test component;
a compile-and-execute module configured to, after the registration module registers the one or more function addresses into the test component:
compile and execute the source code program having the one or more preset debugging codes implanted therein; and
generate an application test page on a terminal user interface; and
a test module configured to, in response to a test execution instruction being triggered by a client on the application test page, call the debugging codes via the function addresses in the test component to test the terminal application;
a setting module configured to:
receive an operating instruction of the client from the application test page;
select a current debugging code from a debugging code list or a current application test number based on at least information associated with the operating instruction of the client; and
save the current debugging code or the current application test number;
wherein the debugging code list and an application test number option are set on the application test page.

24. A non-transitory computer readable storage medium comprising programming instructions for testing a terminal application, the programming instructions configured to cause one or more hardware processors to execute operations comprising:
implanting a test component into a source code program of a terminal application;
writing one or more preset debugging codes into the source code program of the terminal application;
acquiring one or more function addresses of the debugging codes in the source code program of the terminal application;
registering the function addresses into the test component;
after registering the one or more function addresses into the test component, compiling the source code program having the one or more preset debugging codes implanted therein;
executing the compiled source code program;
generating an application test page on a terminal user interface;
in response to a test execution instruction being triggered by a client on the application test page, calling the debugging codes via the function addresses in the test component to test the terminal application;
receiving an operating instruction of the client from the application test page;
selecting a current debugging code from the debugging code list or a current application test number based on at least information associated with the operating instruction of the client; and
saving the current debugging code or the current application test number;
wherein a debugging code list and an application test number option are set on the application test page.

* * * * *